(12) United States Patent
Little et al.

(10) Patent No.: US 6,907,572 B2
(45) Date of Patent: Jun. 14, 2005

(54) COMMAND LINE INTERFACE ABSTRACTION ENGINE

(75) Inventors: Mike J. Little, Santa Barbara, CA (US); Stan Froyd, Carpinteria, CA (US)

(73) Assignee: Occam Networks, Santa Barbara, CA (US)

(*) Notice: Subject to any disclaimer, the term of this patent is extended or adjusted under 35 U.S.C. 154(b) by 413 days.

(21) Appl. No.: 09/927,250

(22) Filed: Aug. 10, 2001

(65) Prior Publication Data
US 2003/0048287 A1 Mar. 13, 2003

(51) Int. Cl.[7] .................................... G06F 15/00
(52) U.S. Cl. ............................ 715/762; 715/764
(58) Field of Search .................. 715/762, 763, 715/764, 765; 345/762, 763, 764, 765, 868, 853, 816

(56) References Cited

U.S. PATENT DOCUMENTS

| | | | |
|---|---|---|---|
| 5,740,444 A | * | 4/1998 | Frid-Nielsen ............... 345/854 |
| 6,141,009 A | * | 10/2000 | Li et al. ..................... 345/835 |
| 6,141,660 A | * | 10/2000 | Bach et al. .................. 707/103 |
| 6,195,097 B1 | | 2/2001 | Shrader et al. |
| 6,430,542 B1 | | 8/2002 | Moran |

OTHER PUBLICATIONS

PCT Search Report, PCT/US02/25166, Dec. 18, 2005, 5 pages.

* cited by examiner

*Primary Examiner*—Cao Nguyen
(74) *Attorney, Agent, or Firm*—Blakely, Sokoloff, Taylor & Zafman LLP.

(57) ABSTRACT

A CLI description language is implemented to define a set of command keywords and arguments forming CLI description files. The CLI description language is implemented using Extensible Markup Language (XML). A set of XML tags and corresponding semantic definitions are provided. An XML schema is defined for the CLI description language. The CLI description files are compiled into runtime format using the XML schema. The CLI description files provide a mapping of object names to services of the system.

29 Claims, 17 Drawing Sheets

| Tag | Attributes | Text | Description |
|---|---|---|---|
| <cli> | - | - | Contains zero or more models |
| <mode> | name | - | Contains zero or more command tags. Attribute is required. |
| <command> | - | - | Contains a required keyword tag. |
| <keyword> | text | - | Contains zero or more keyword tags, with an optional action or help tag. Attribute is required. |
| <help> | - | Yes | May be embedded in keyword or arg elements. |
| <action> | object method | - | Contains zero or more arg tags. The attributes are required. |
| <arg> | - | - | Contains a single instance of type tag, may contain a help tag. |
| <type> | Type | - | Empty tag. Attribute is required, must be a valid java type. |

Command> show clock
     * 04:10:12. 621 UTC Thu May 6, 1993
200

Command> snow clock detail
205     *04.10.18.109 UTC Thu May 6, 1998
     Time source is user configuration

```
</xml version="1.0" endodings="US-ASCII"?>
<!DOCTYPE cli SYSTEM "cli.dtd">
<cli>
<mode name="global">
. . . .
<command>
    <keyword text="show">
    <help>Show running system information</help>
. . . . <!-lots of other show keywords. . . -->

<keyword text="clock">
            <?help>display the system clock</help>
            <action object="Clock" method="show">        212
            </action>

<keyword text="detail">
                <help>Display detailed information </help>
                action object="Clock" method="showDetail">
                </action>
            </keyword>
        </keyword>
    </keyword>
</command>
</mode>
</cli>
```
210 { ... 215 }

FIG. 2

321 Command > clock set ?
    hh:mm:ss  Current Time

322 Command > clock set 00:00:00 ?
    <1-31> Day of the Month
    Month of the Year 323 Command > clock set 00:00:00 25 Sep ?
    <1993-2035> fear 324 Command > clock set 00:00:00 25 Sep 2000

Command >

325 {
```
<command>
    <keyword text="clock">          327
        <help>Manage the System clock</help>
        <keyword text="set">        328
            <help> Set the time and date</help>
            <action object="Clock" method="set">    329
                <arg> <!-time argument -->
                    <type type="java.land.String"></type>
                    <help>hh:mm:ss Current Time </help>     330
                </arg>
                <arg> <!-day of the month argument -->
                    <type type="java.lang.Integer"></type>
                    <help><1-31> Day of the month</help>   335
                </arg>
                <arg> <!-day of the month argument -->
                    <type type="java.lang.Integer"></type>
                    <help>Month Month of the year </help>   340
                </arg>
                <arg> <!-year argument -->
                    <type type="java.lang.Integer"></type>
                    <help><1993-2035> Year</help>     345
                </arg>
            </action>
        </keyword>
    </keyword>
</command>
```

FIG. 3

```
<?xml version ='1.0' encoding="us-ascii"?>
<!-DTD for cli description file-->

<!-The cli tag is the topmost element. Contains zero or more modes. -->
<!ELEMENT cli (mode*)>

<!--The mode tag contains zero or more command tags. The mode must
    have a name, for example "golbal", " exec", " config" -->
<!ELEMENT mode (command*)>
<!ATTLIST mode
    name CDATA #REQUIRED
>

<!-The command tag contains a single keyword-->
<!ELEMENT command (keyword)>

<!--The keyword tag contains zero or more subkeywords, with an optional
    single instance of action or help. The single attribute is the keyword test
    which must be present -->
<!ELEMENT keyword ((keyword)*, action?, help?>
<!ATTLIST keyword
    test CDATA #REQUIRED
>

<!-- The action tag contains zero or more argument tags. The "object"
        and "method" attributes must be present and defined"
<!ELEMENT action (arg*)>
<!ATTLIST action
    object CDATA #REQUIRED
    method CDATA #REQUIRED
>

<!-- The arg tag contains a single instance of a type tag and an
    optional help tag -->
<!ELEMENT arg (type,help?)>

<!--The type tag is an empty tag with a required attribute "type". The
    value of the attribute should be a Java class name -->
(!ELEMENT type EMPTY)>
<!ATTLIST arg
    type CDATA #REQUIRED
>

<!-- The help tag encloses some text -->
<!ELEMENT help (#PCDATA)>
```

FIG. 4

```
<keyword text = "FastEthernet">
  <help>FastEthernet IEEE 802.3</help>
  <action object = "ethManager" method="show">
    <arg>
      <type type="java.lang.String"><type>
      <help>
        <0-6> FastEthernet interface number
      <help>
    </arg>
  </action>
</keyword>
```

700

710
keyword = "FastEthernet"
help = "Fast..."
parent
substates = ( )
action

712

720
object_name = "ethManager"
method_name = "show"
arguement_types = ("java.lang.String")
argument_help = ("<0-6> Fast...")

| Command | Keyword Set |
|---|---|
| show date | ("show"," date") |
| show date detail | ("show"," date"," detail") |
| clock set | ("clock"," set") |

| Argument Number | Argument Description | Argument Help |
|---|---|---|
| 1 | Time in 00:00:00 format | hh:mm:ss Current time |
| 2 | day of the month in integer format | <1-31> Day of the month |
| 3 | month in three letter format | MONTH Month of the Year |
| 4 | Year in integer format | <1993-2035> Year |

FIG. 14

| Command Keyword Sequence | Help |
|---|---|
| show | show running system Information |
| clock | Manage the system clock |
| show clock | Display the system clock |
| show clock detail | Display detailed information |
| clock set | Set the time and date |

FIG. 15

| Argument Number | Argument Description | Java Type |
|---|---|---|
| 1 | Time in 00:00:00 format | java.lang.String |
| 2 | day of month integer format | java.lang.Integer |
| 3 | Month in three letter format | java.lang.String |
| 4 | Year in integer format | java.lang.Integer |

FIG. 16

```xml
<?xml version='1.0 encoding='US...ASCII' ?>
<! DOCTYPE cli SYSTEM "cli.dtd">
<cli>
<mode name="exec">

<command>
        <keyword text= "show" >
        <help>Show running system information</help>
        .... <!--lots of other show keywords... -->

<keyword text=" clock'>
                </help>Display the system clock </help>
                <action object="Clock" method= "show">
                </action>

<keyword text="detail">
                <help>Display detailed information</help>
                action object="Clock" method="showDetail">
                </action>
                </keyword>
        </keyword>
</ command>
```

FIG. 17

```
<command>
    <keyword text="clock"
    <help>Manage the System clock</help>

<keyword test="set">
        <help> Set the time and date</help>
        <action object="Clock" method="set">

<arg><!-- time argument -->
            <type type="Java.land.String"></type>
            <help>hh:mm:ss Current time</help>
            </arg>

<arg> <! -- day of the month argument -->
            <type type=Java.land.Integer"></type>
            <help><1-31> day of the month</help>
            </arg>

<arg> <! -- day of the month argument -->
            <type type="Java.land.Integer"></type>
            <help>MONTH Month of the year</help>
            </arg>

<arg> <! -- year argument -->
            <type type="Java.land.Integer"></type>
            <help><1993-2035> Year</help>
            </arg>

</action>
        </keyword>
    </keyword>
</ command>
```

FIG. 18

```
public void show () {
    SimpleDateFormat formatter =
        new SimpleDateFormat ("hh:mm:ss.SSS zzz EEE MMM dd yyyy");
    System.out.println("*" + formatter.format (new Date()));
} public void showDetail () {
    this.show();
    if (Clock.source())
        System.out.println ("Time source is user configuration");
    else
        System.out.println ("No time source");
}
```

FIG. 19

```
public void set (String time, Integer day, String month, Integer year)
        throws IOException, InterruptedException, CLIArgumentException
(
            //Validate the arguments
            SimpleDateFormat format = new SimpleDateFormat ("hh:mm:ss);
            format.setLenient (false);
            try { format parse (time)
            } catch (ParseException e) {
                throw new ArgumentException (1);
            } if (day.intValue() < 1 || day.intValue() > 31)
                throw new ArgumentException (2);

format.applyPattem ("MMM");
            try { format.parse(month);
            } catch (ParseException e) {
                throw new ArgumentException (3);
            } if (year.intValue() < 1993 || year.intValue 0> 2035
                throw new ArgumentException (4);

// One last check for day, month and year validity (e.g., Feb 31)
            format.applyPattem (" dd MMM yyy");
            try { format.parse(day.toString() + month + year.toString());
            } catch (parseException e) {
                CLIEngine.out.println("Invalid date (doesn't exist)");
                Return;
            }

// Do the actual work
            String [] cmd = {" /bin/date", "-s", time + "" + day + "" + month + "" + year
                };
            Process proc = Rumtime.getRuntime().exec (Cmd);
            proc. waitFor(); if (proc.exitValue() > 0) {
            CLIEngine.err.println("Operation not permitted");
                return;
            } clock.sourceSet() ;
```

FIG. 20

COMMAND LINE INTERFACE ABSTRACTION ENGINE

FIELD OF THE INVENTION

The present invention relates generally to field of command line interface application. More specifically, the present invention is directed to abstracting command line interfaces from embedded systems.

BACKGROUND

An embedded system is a specialized computer in which operating system and application functions are often combined into the same program. Generally, an embedded system implies a fixed set of functions programmed into a non-volatile memory (ROM, flash memory, etc.) in contrast to a general-purpose computing machine.

Embedded systems are growing more and more complex, requiring a range of external management applications such as SNMP, Command Line Interfaces, TNM, WBEM, etc. These applications have completely different interfaces, network protocols and purposes but must all interface to the low-level internals of the embedded system.

In order for an embedded system to perform successfully in an environment, it is necessary that the embedded system be configured to operate as desired for troubleshooting and monitoring purposes. Further, the embedded system needs to be able to provide its current configuration or restore to a saved configuration when requested. This functionality is collectively known as "management" of the embedded system.

Management of the embedded system may be effected through a variety of user interfaces. The most common is Command Line Interface (CLI), where configuration and display commands are entered in text mode and promptly executed. Another common interface is Simple Network Management Protocol (SNMP) where configuration and monitoring data is transmitted over the network.

Prior technology for implementation of command line user interfaces relies on a set of closely coupled functions between the commands defined and the application functions or services of the embedded system. Typically a set of function calls is provided by the embedded system and utilized in the implementation of the CLI. This leads to a dependency of the user interface application on the underlying implementation of the embedded system which requires the embedded system services to provide a consistent interface to the CLI.

Since the user interface application and the application functions (or services) in the embedded system are inextricably linked through this functional interface (i.e., function calls), this leads to a brittle code structure that is not easily extended, difficult to manage and maintain. It would be advantageous to have a method that provides a generalized user interface to an embedded system in such a way that the generalized user interface is decoupled from the services and features delivered and implemented in the embedded system.

SUMMARY OF THE INVENTION

In one embodiment, a method for abstracting a command line interface (CLI) from an embedded system is disclosed. A CLI description language is implemented to define a set of command keywords and arguments forming CLI description files. The CLI description language is implemented using Extensible Markup Language (XML). A set of XML tags and corresponding semantic definitions are provided. An XML schema is defined for the CLI description language. The CLI description files are compiled into run time format using the XML schema. The CLI description files provide a mapping of object names to services of the system.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

FIG. 1 illustrates exemplary XML (Extensible Markup Language) tags used in XML CLI description files.

FIG. 2 is an exemplary illustration of CLI commands and a corresponding XML fragment.

FIG. 3 is an exemplary illustration of CLI commands with arguments and argument help and a corresponding XML fragment.

FIG. 4 illustrates an exemplary DTD schema used in accordance with the present invention.

FIG. 7 is an exemplary illustration of relationship among an XML description fragment, a CLI State and a CLI Action.

FIG. 13 illustrates exemplary keyword sets for each of these commands.

FIG. 14 illustrates exemplary arguments for the "clock set" command.

FIG. 15 illustrates exemplary help strings for different command sequence.

FIG. 16 is an exemplary table illustrating CLI arguments to Java type mapping.

FIG. 17 illustrates an exemplary XML CLI description file for the "show clock" and "show clock detail" commands.

FIG. 18 illustrates an exemplary XML CLI description file for the "clock set" command.

FIG. 19 illustrates exemplary Java methods for the "clock set" and "clock set detail" commands.

FIG. 20 illustrates an exemplary Java method for the "clock set" command.

DETAILED DESCRIPTION

Figure 5:
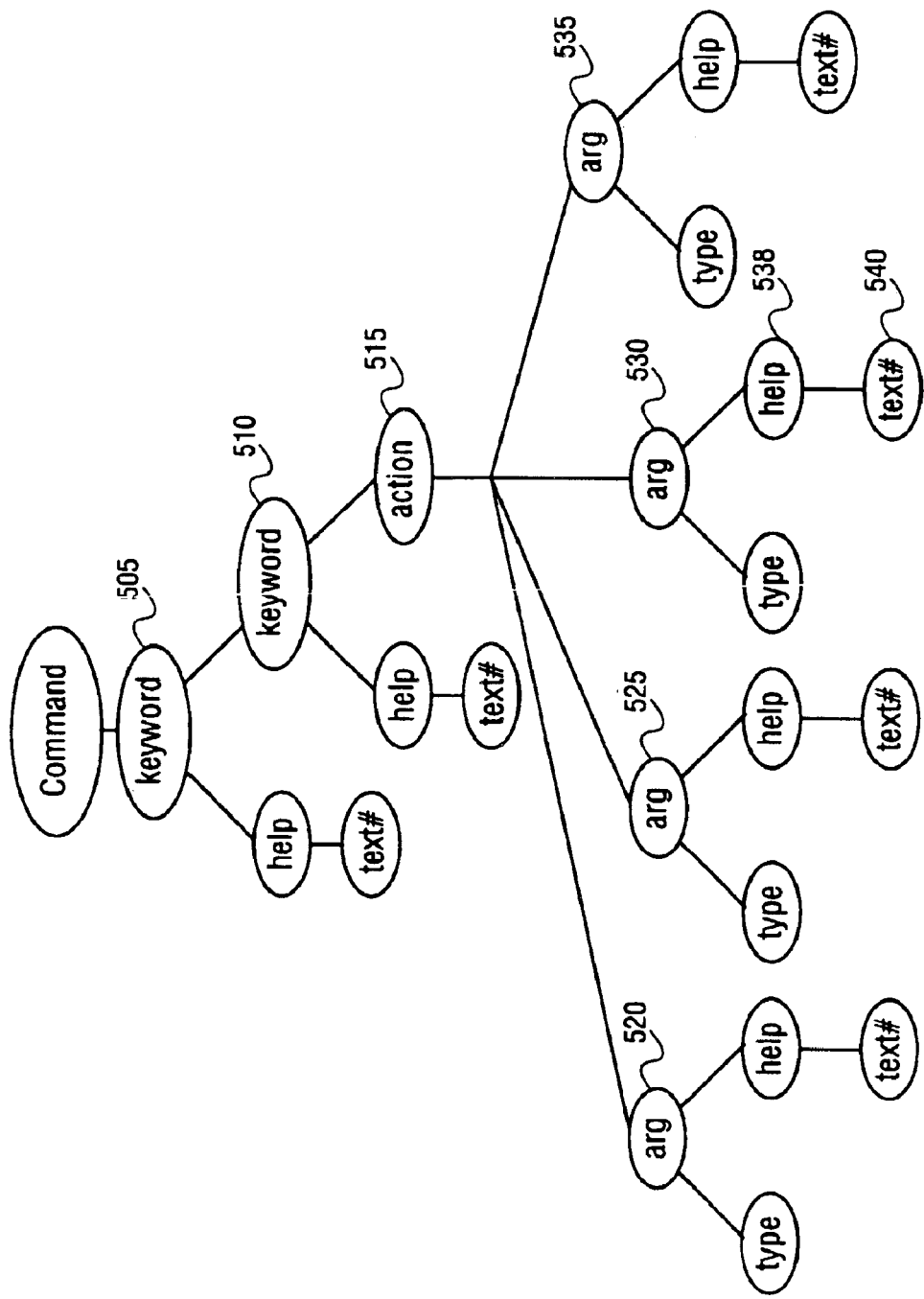
FIG. 5 is an exemplary illustration of a Document Object Model (DOM) tree of an XML fragment describing a "clock set" command.

In one embodiment of the present invention, a method for abstracting a command line interface (CLI) application from an embedded system is disclosed. The abstraction separates high-level applications from the details of the embedded system. A CLI description language is implemented to define a set of command keywords and arguments forming CLI description files. The CLI description files are compiled to create run time modules. The runtime modules are provided as an application from the embedded system to interface applications.

The following detailed description sets forth numerous specific details to provide a thorough understanding of the invention. However, those of ordinary skill in the art will appreciate that the invention may be practiced without these specific details. In other instances, well-known methods, procedures, protocols, components, algorithms, and circuits have not been described in detail so as not to obscure the invention.

In this description, the CLI application refers to an application that allows for interaction with an embedded system (also referred to as a system or a platform). The CLI application is specified by a collection of modes, commands, keywords, and arguments that are used to command, control, and configure the systems.

Generally, a system is managed by using high-level applications that collect data from or send data to the system. The high-level applications may issue commands to the CLI application. In one embodiment of the present invention, a framework is provided for abstracting the low-level elements of the system forming a CLI application. The framework provides a system wide abstraction layer, below which are kernel device drivers and various system services software in the system and above which are the high-level applications that manage the system. Using this framework, the high-level applications can be insulated from the implementation of services on the system.

In one embodiment, architecture for the CLI application includes XML CLI description files, an XML compiler, a CLI interpreter, and a set of system interfaces. The XML CLI description files use XML syntax to describe features and structure of the CLI. This includes CLI modes, command, keyword and sub-keyword structures, help text for keywords and arguments, and specification of actions performed for a command. The XML compiler compiles the XML CLI description files into a format usable by a runtime system. The CLI interpreter is the runtime system responsible for presenting the CLI commands and for executing the actions specified by the CLI commands. The system interfaces includes a collection of Java interfaces (e.g., classes and methods). During runtime, the CLI commands are performed based on their semantics. The XML CLI description files, the XML compiler, the CLI interpreter, and the set of system interfaces form the framework to create the CLI application.

FIG. 1 illustrates exemplary XML (Extensible Markup Language) tags used in XML CLI description files. Each XML tag occurs in an XML CLI description file as a <tagname> . . . </tagname> combination. Attributes are enclosed in the tag fields with their values bounded by a pair of double quotation marks. In one embodiment, each of the XML CLI description files have the following form:

```
<?xml version=· 1.0 encoding=· US-ASCII'?>
<!DOCTYPE cli SYSTEM " cli.dtd">
    <!—CLI Definitions here...-->
```

The first line is an XML declaration that specifies the type of the document as an XML document. The second line is a document type declaration that attaches the .XML file to a particular schema. In this case the schema is "cli.dtd". The second line also specifies that the top-level element is "cli". The remainder of the document includes the specific tags used to define the CLI constructs.

The <cli> tag 105 is the top-level element of the XML document. All other tags are sub tags of this top-level <cli> tag 105. This <cli> tag 105 has no attributes and text inside the <cli> tag 105 is ignored. The <mode> tag 110 contains the mode of the management command. There should be only one <mode> tag 110 in the XML document. The <mode> tag 110 has a single attribute which identifies the name of the mode such as, for examples, <mode name='global'> or <mode name="exec"> for global or executive mode.

The <command> tag 115 is the top-level tag for a single command. It has no attributes and any text inside the <command> tag 115 is ignored. The <command> tag 115 contains a single <keyword> tag such as, for example,

```
<command>
    <keyword text="show">
    </keyword>
</command>.
```

The <keyword> tag 120 specifies the text of a command keyword in the command set of the CLI such as, for example "show", "enable" or "logout". The text is supplied by the single attribute "text". The keywords may include other <keyword> tags to specify sub keywords.

The <help> tag 125 specifies help information for the command/keyword. The <help> tag 125 has no attributes. The text enclosed by the <help> tag 125 defines the help text for the outlying tag, i.e. for a keyword or argument. One example of the help information follows:

<keyword text="show">

<help>Show running system information </help>

<keyword text="clock">

</keyword>

The <action> tag 130 specifies that there is an executable action for the enclosing keyword. For example, the action specified within the <action> tag 130 is carried out for the associated command when the carriage return is presses. The "object" and "method" attributes of the <action> tag 130 specify an object and a method in the system by name. A collection of Java type interfaces is created for the "objects" and "methods" that get invoked during run-time. Following is one example of the object and the method follows:

<action object="CLISystem" method="clock">

</action>.

The <arg> tag 135 defines an argument type for an <action> tag 130. The <arg> tag 135 has no arguments and text in the <arg> tag 135 is ignored. A single <type> tag or <help> tag may be inserted in the body of the <arg> tag 135. Following is one example of the <arg> tag 135:

```
<arg>
    <type type="Java.lang.String"></type>
    <help>destination address or hostname</help>
</arg>
```

The <type> tag 140 describes a Java type for input to the invocation of the object, method pair specified by the <action> tag 130. The Java type name is entered as a "type" attribute of the <type> tag 140. Other text in the body of the <type> tag 140 other than those associated with the "type" attribute is ignored.

In this example, XML is used to describe the command language. XML is advantageous because there are a lot of available XML tools (e.g., editor tool, browser tool, etc.) for development. Although XML is used, one skilled in the art would recognize that other generalized markup languages might also be used to describe or map the management commands to the objects of the system, where the objects are low-level functions implemented in the system.

The CLI commands are generally in the following format:

Prompt> keyword$_1$ keyword$_2$ . . . keyword$_n$ arg$_1$ . . . arg$_n$

For example, the commands may be:

Prompt> show clock detail, or

Prompt> show interfaces fast Ethernet 0/0.

The structure of the XML CLI description file expresses the format of the commands. The keyword tags embedding expresses the sequence above. Following is an example of a XML CLI description fragment for a command:

Note that the structure of the command's keyword and sub keywords is reflected in the nesting of the <keyword> tags in the XML CLI description file In addition, any number of commands, keywords, sub keywords and help for each of the associated keywords may be nested and created by this syntax.

FIG. 3 is an exemplary illustration of CLI commands with arguments and argument help and a corresponding XML fragment. In this example, the command is a "clock set" command. The command 321 illustrates the "help" feature by specifying the "?" as part of the of command argument. This "help" feature is also illustrated in the command 322 and 323 to get additional information about the format (e.g., time, month, year) of the "clock set" command. The command 324 illustrates a complete "clock set" command with all the possible arguments specified.

The XML fragment 325 describes the "clock set" commands 321–324 using the XML tags described in FIG. 1. The XML fragment 325 describes the hierarchy of the CLOCK SET command keyword by keyword. At run-time, the command CLOCK SET issued by the user or the management application is recognized by the CLI interpreter

```
<command>
    <keyword text="keyword₁">
        <keyword text="keyword₂">
            ...
            <keyword text="keywordₙ">
                <action object="example" method="whatever">
                                                <!—argument arg₁-->
                    <arg><type type="Java.lang.Striflg"></arg>
                        ...
                                                <!—argument argₘ-->
                    <arg><type type="Java.lang.String"></arg>
                </keyword>
            ...
        </keyword>
        <keyword>
<command>
```

FIG. 2 is an exemplary illustration of CLI commands and a corresponding XML fragment. The CLI description fragment 210 may be part of a XML CLI description file. The CLI commands in this example include a "show clock" command 200 and a "show clock detail" command 205. The respective output is shown below each command. These commands 200, 205 are represented by the XML CLI description fragment 210 using XML tags described in FIG. 1. The XML CLI description fragment 210 describes the "show clock" command using keywords, sub-keywords, help text, arguments, and specification of actions to be carried out.

The XML CLI description fragment 210 is presented in its source format and is normally compiled using an XML compiler so that it can be used by a run-time system. When a user or a management application issues a CLI command, the run-time system performs object mapping, method mapping and the arguments are provided to carry out the action. For example, when the command "show clock" command 200 is issued, the run-time system executes the action associated with an object "clock" and a method "show", shown on line 212. When the command SHOW "clock detail" 205 is issued, the run-time system executes the action associated with an object "clock" and a method "showdetail," as shown on line 215. The run-time system invokes a collection of Java system interfaces corresponding to the object and method specified in the action.

as corresponding to the command keyword CLOCK shown on line 327 and the keyword SET shown on line 328. There may be multiple command keywords in the same XML document in addition to the CLOCK command. The CLI interpreter will parse the XML fragment 325 to determine if the command is a valid command. In the current example, the help information requested in the commands 321–323 is enclosed in the <help> tags on lines 330, 335, 340 and 345 respectively.

Depending on the format of each of the CLOCK SET commands 321–324, appropriate data is extracted from the arguments of the XML fragment 325 and is pushed to system. The action specified by the "object" and "method" attribute of the <action> tag shown on line 329 is performed by the system.

A Document Type Definition (DTD) is used to provide formal description of the structure of the XML CLI description file in terms of XML tags described in FIG. 1. A DTD is a file (or several files to be used together), which contains a formal definition of a particular type of document (e.g., the XML CLI description document). It sets out a schema of names that can be used for element types, where they may occur, and how they all fit together. The format of the DTD is known to one skilled in the art. In one embodiment, the DTD is used in this invention to provide notice of what names and structures to be used for XML CLI description documents. Using the DTD, XML CLI description documents are ensured to be constructed and named in a conformant manner. The DTD not only defines the valid XML CLI description files, but it can also be used by the tools to validate any input file before processing or by editors to assure that edited files conform to the DTD. FIG. 4 illustrates an exemplary DTD schema used in accordance with the present invention.

The XML tags and DTD schema described above represent the minimum required to implement the CLI application. It will be apparent to one skilled in the art that the set of XML tags, tag attributes, and the structure of the XML may be extended to accommodate other requirements or features required by the CLI application or other management tools. For example, XML tags may be added for documentation, web interface, or other management applications.

The set of CLI modes and commands may be described in XML CLI description files using the XML tags and the DTD schema. The XML CLI description files are translated by a Java tool called CLIBuilder into a format suitable to be interpreted at runtime by the CLI Interpreter (also referred to as a CLIEngine). In one embodiment, each XML CLI description file has a ".xml" suffix. The CLI Builder tools take the XML CLI description files and generate output files that are used as input to the CLI interpreter at runtime. In one embodiment, each output file has a ".cli" suffix. The CLIBuilder validates syntax and format of the XML CLI description files against the "cli.dtd" DTD schema. For example, the CLI Builder validates an XML CLI description file named "config.xml" and generates a "config.cli" file. The resulting "config.cli" file is to be inputted to the CLIEngine at runtime.

FIG. 5 is an exemplary illustration of a Document Object Model (DOM) tree of an XML fragment describing a "clock set" command. In one embodiment, the CLIBuilder uses a Java DOM library to parse the input XML CLI description file into a DOM object model tree (or DOM tree). The DOM tree is a collection of Java objects that represent the tags, attributes, and text of an XML CLI description file. Each Java object is represented as a node in the DOM tree in FIG. 5. The structure of the DOM tree shows relationship of the XML tags and text in the XML CLI description file. The structure also contains all of the text enclosed by any of the tags so that every piece of information in the XML CLI description file is reflected in the resulting DOM tree.

Each XML CLI description file is translated into the DOM tree format that can be interpreted at run-time. In one embodiment, a set of Java classes is used to provide for a more compact representation of the keywords and actions represented in the DOM tree. The CLIBuilder starts with the DOM tree and translates the DOM tree into a collection of Java runtime classes.

The DOM tree in FIG. 5 corresponds to the "clockset" command described in the CLI description fragment 225 illustrated in FIG. 2. Note that there are two keyword nodes 505, 510 corresponding to the keywords "clock" and "set" respectively. Note also that there are four argument nodes 520–535 under the action node 515. The four argument nodes 520–535 correspond to the arguments for "time", "day of month", "month" and "year" of the "clock set" command. The node 540 contains text associated with the "help" node 538, which provides help information to the "arg" node 530.

Figure 6:
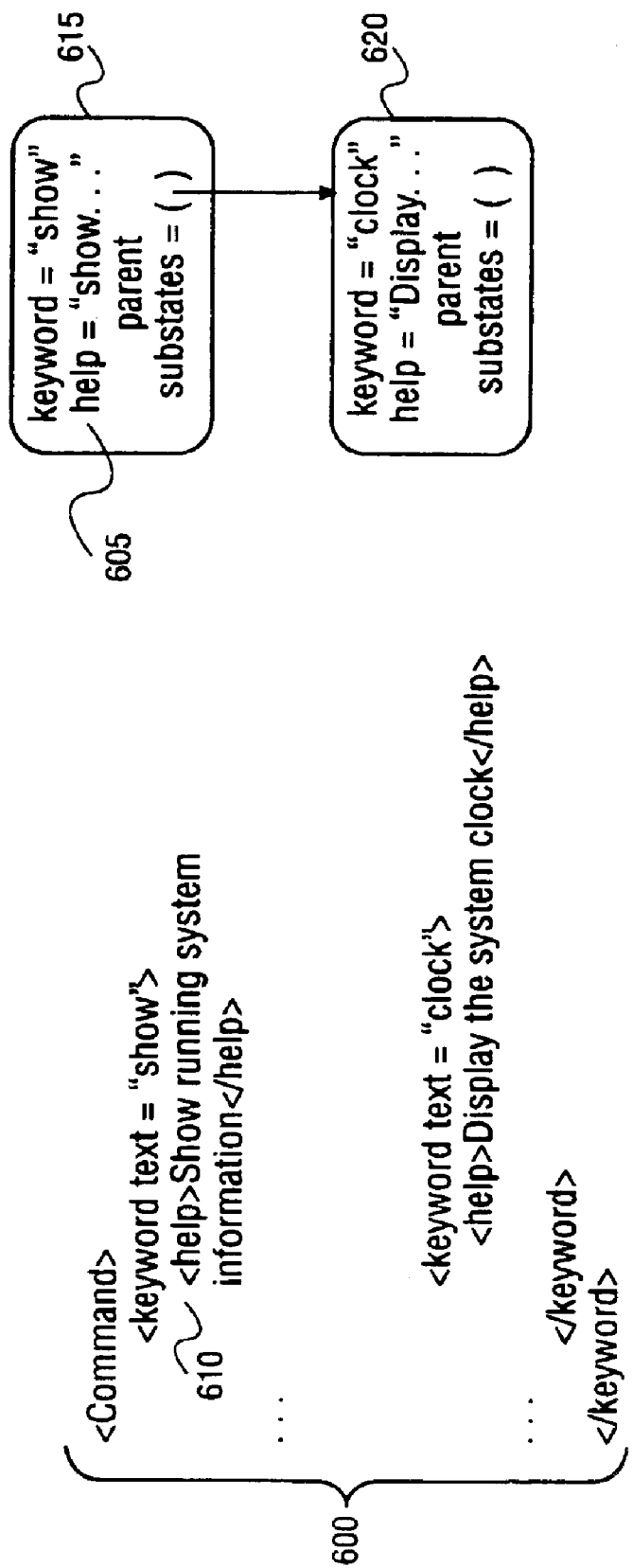
FIG. 6 is an exemplary illustration of a mapping from a XML CLI description file to a corresponding Java class CLIState.

FIG. 6 is an exemplary illustration of a mapping from a XML CLI description file to a corresponding Java class CLIState. The Java class CLIState is a construct that implements the CLI behavior based on the user input. It also embodies the structure of the keywords and commands inherent in the XML CLI description files and in the DOM trees. To convert from the XML CLI description files and the DOM trees, the following exemplary attributes may be used for the CLIState class.

private String keyword
 private String help
 private AbstractMap substates
 private CLIState superstate
 private CLIAction action Each CLIState has a keyword label, possible children substates, a parent state, and an action. This is analogous to the <keyword> tag in the XML CLI description file. The keyword is the label or text for the CLIstate. This is the text attribute of the <keyword> tag. Referring to FIG. 6, from the XML fragment 600, the "help" field 605 gets its content from the text of the <help> tag 610 in the XML fragment 600 of the enclosing <keyword> tag. Each of the keyword tags is represented by a CLIState. For example, the keyword "show" in the XML fragment 600 is represented by the CLIState 615, and the keyword "clock" is represented by the CLIState 620.

When a keyword tag encloses other keyword tags, then each of the CLIStates is a sub state of an enclosing CLIstate. For example, the CLIState 620 is a sub state of the CLIState 615. Similarly, the CLIState 615 may be a sub state of another CLIState. A super state is a parent node in the CLIstate tree for this CLIState. It is the enclosing keyword tag in the XML CLI description file. For example, the CLIState 615 is the super state for the CLIState 620. If there is no enclosing keyword (i.e. the keyword is already a top-most keyword of a command), then a CLIState representing the mode of the command is the super state. The action is an action for the CLIState. If there is an action tag present in the XML CLI description file, this will be non-null.

To translate from the XML CLI description file to the CLIState structure, a CLIState is created for each <keyword> tag in the XML CLI description file. The mapping between the keyword and the CLIState is one-to-one. The keywords enclosed by another <keyword> tag are children (or sub states) of the enclosing CLIState. The <help> and <action> sub tags of a keyword are saved as values in the CLIState representing the keyword tag.

Figure 8:
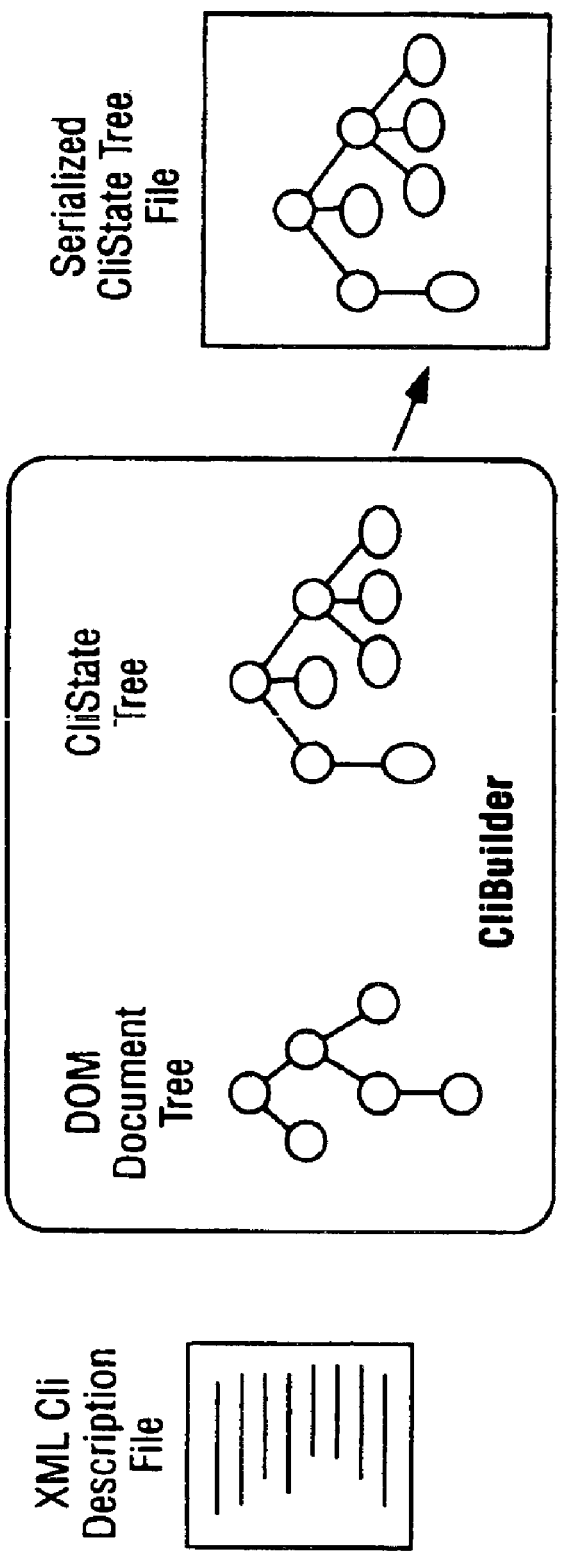
FIG. 8 is an exemplary illustration of the CLIBuilder generating ".cli" files to be interpreted by a CLI Interpreter.

FIG. 7 is an exemplary illustration of relationship among an XML description fragment, a CLI State and a CLI Action. In one embodiment, an <action> tag content in the XML CLI description fragment 700 is converted into a Java class CLIAction 720. Similar to the way the CLIState 710 embodies the information and structure of the modes, command, and keyword tags from the XML CLI description fragment 700, the Java class CLIAction 720 contains all the content of the <action> and the sub tags <type> and <help> from the XML CLI description fragment 700. To convert from the XML CLI description files and the DOM trees, the following exemplary attributes may be used for the CLIAction class.

private String obeject_name
 private String method_name
 private String [ ] argument_types
 private String [ ] argument_help The "object_name" 712 is the same as the value of the "Object" attribute of the <action> tag in the XML CLI description file. The "object_name" is the name of the Java object that will be invoked when this action is performed. The "method_name" 714 is the value of the "Method" attribute of the <action> tag in the XML CLI description fragment 700. This is the string of the method that will be invoked when this action is performed. The "argument_types" 716 is the value of the "Type" attributes of the <type> tag in the XML CLI description fragment 700. The "argument_types" is an array that is filled in order of the <arg> tags present in the action. The "argument_help" 718 is the text of the <help> tags for each <arg> in the XML structure. The CLIState 710 and the CLIAction 720 embody the XML CLI description fragment 700 and the corresponding DOM tree representation. The structure of CLIStates and the CLIActions is then serialized by a CLIBuilder into a file to be read by the CLI Engine (or CLI Intepreter) for interpretation, as illustrated in FIG. 8.

The runtime behavior of the CLI system is performed by multiple Java classes. The Java class CLIState implements the structure of the CLI commands keywords via transitions, as described above. The Java class CLIAction translates arguments from the input string and then invokes the object and method required for that input. The CLIEngine class initializes and keeps track of global states of the CLI and houses the object registry. The system interface class is the collection of Java objects that are invoked by the CLIActions.

Figure 9:
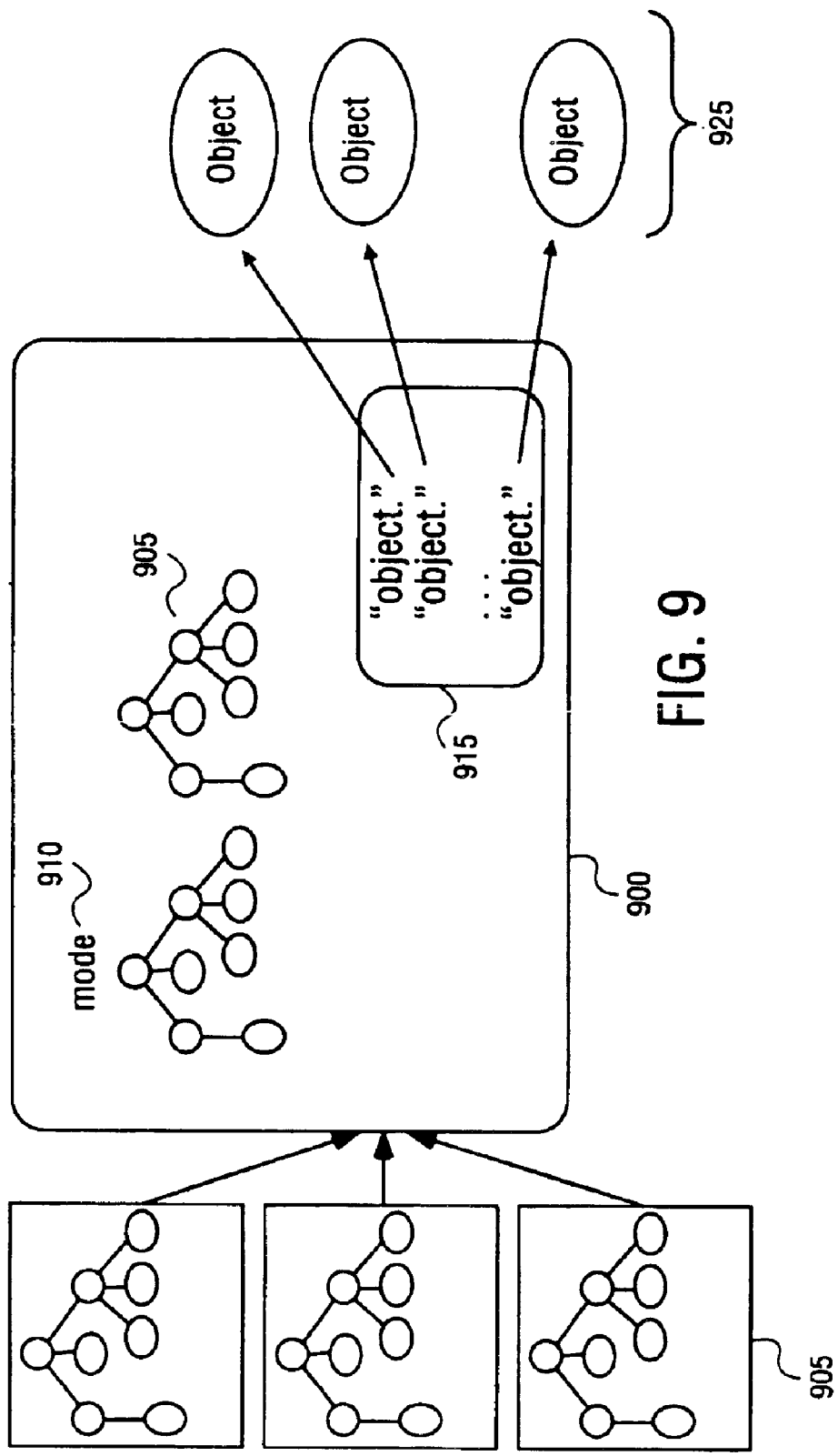
FIG. 9 is an exemplary illustration of a CLI Interpreter.

FIG. 9 is an exemplary illustration of a CLI Interpreter. The Java class CLI Interpreter 900 is the main control structure of the CLI runtime and performs housekeeping duties including initialization, object registration, action resolution and context data. During initialization, the CLI Interpreter 900 installs the CLIState trees 905 into the system. The CLIState trees 905 are internally installed and are associated with the CLI modes 910. The system interface 925 includes objects that are registered and associated with an object name in an object registry 915. This is the same name that is referenced by the actions in the CLIState tree or with the object attribute in the XML CLI description file. For action resolution, the CLIAction instances (in the CLIState trees) contain string references to the objects and methods that comprise the system interface 925. These are resolved into action objects and methods using the object registry 915 of the CLI Interpreter 900. Context data refers to all data that is global to the running of the engine itself and includes "current mode", "prompt" and "I/O stream". The CLI is generally in a "current" mode which corresponds to a particular CLIState tree that is active. A CLI prompt is formatted according to the current mode, and the CLI can take input from or output to (i.e., I/O stream) any kind of stream (e.g., a file or interactive input).

In one embodiment, the objects are registered in the system through a static method of the CLIEngine. For example, the method is RegisterObject (Object, String).

This registration function should be done sometime during the initialization of the system. The method takes the object being registered and its "string name" (i.e., the name found in the XML CLI description file) as the object attribute of the action tag. For example, using the above method, the following registration can be done:

CLIEngine.registerObject (new InterfaceManager, "ethManager");

The object registry is used to resolve the static CLIAction information from the XML CLI description file to references to the actual objects and methods of the system interface.

As previously described, the CLIStates model the keyword tags of the XML CLI description files, their keyword labels, and the structure of possible substates and parent state (or super state). Recall that the CLIStates have the following attributes:

private String keyword;
private String help;
private AbstractMap sub states;
private CLIState super state;
private CLIAction action.

The CLIStates also model behavior of the interfaces through the transition functions. In addition to the above method, another method is:

public void transition (StringTokenizer input);

where the "keyword" is the label or the text for the CLIState. During runtime, the valid input to transition to this state is from its parent. The "help" is displayed when the transition input is the help token "?". The "sub states" is an abstract map "M" such that:

M: String → CLIState.

The keyword field of the sub states is the key set for this mapping. The "sub states" themselves are the resulting values. This allows for implementing the transition function. The "super state" is the upper node in the CLIState tree for this CLIState. The transition is the function that implements a walk of the CLIState tree based on the user input. For example, for an input token string k, CLIState p with sub state s, the transition function is:

p.transition(k)=s if and only if (s.keyword=k)

Figure 10:
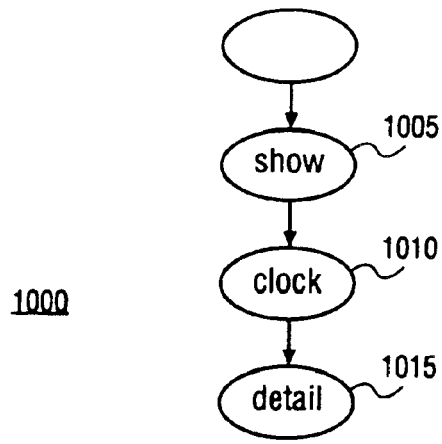
FIG. 10 illustrates an exemplary CLIState tree.

The "action" indicates action for the CLIState. The action is invoked when it is at the end of the input and/or when the CLIState is a terminal node (i.e. no children). FIG. 10 illustrates an exemplary CLIState tree. The CLIState tree 1000 represents the "show clock" and the "show clock detail" commands. The different CLIStates 1005, 1010, 1015 are labeled in the CLIState tree 1000 in FIG. 10. There may be other sub states under the initial state, show states, etc.

Figure 11:
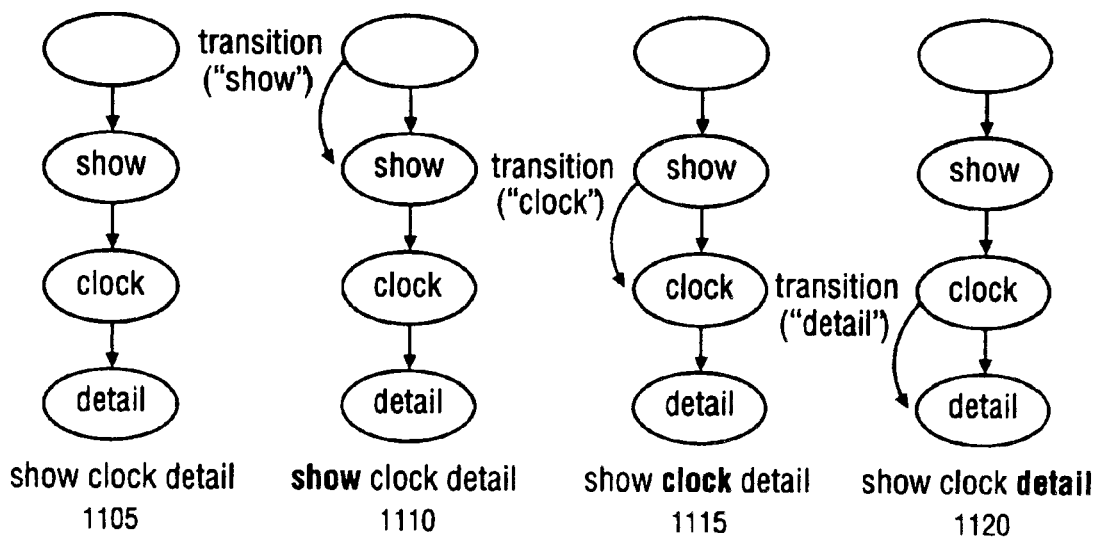
FIG. 11 illustrates exemplary CLIState transitions for the CLIState tree in FIG. 10.

FIG. 11 illustrates exemplary CLIState transitions for the CLIState tree in FIG. 10. Each CLI State represents a possible transition from an input token that matches its keyword. The transitions of the CLI State tree from the initial node down to the leaf are illustrated in FIG. 10. The CLIState tree 1105 is similar to the CLIState tree 1000. The CLIState tree 1110 illustrates transition after encountering the token "show". The CLIState tree 1115 illustrates transition after further encountering the token "clock". The CLIState tree 1120 illustrates transition after further encountering the token "detail".

The CLIState tree is navigated based on the input tokens using the transition method of the current node in the CLIState tree. The transition function implements all of the runtime behavior of the CLIState tree, including navigation, command help, partial command help, unknown and incomplete command checks and whether an action should be invoked.

Upon receiving the serialized input (i.e., the serialized CLIState tree file described in FIG. 8), the CLIAction object in the CLIState contains the static description of the object, method, and types of the arguments. The CLIAction invokes the specific action specified by the CLIState. This is basically the XML content described above, including:

private String obeject_name,
private String method_name,
private String [] argument_types, and
private String [] argument_help.

Via the resolve method of the CLIAction, these strings are converted, using reflection and the input object_map from the CLIEngine, into the actual object, method, and constructors that are used to invoke the method.

Consider the following exemplary action:
   private Object object;
   private Method method;
   private Constructor [] constructor;
   public void resolve (AbstractMap object_map)
   { . . . }
   public void execute (StringTokenizer input)
   { . . . }
where the "object" is the reference to the actual object that will be invoked when this action is executed. The "object_name" field is used as the key to index into the input "object_map". The "object_map" is the object repository that is compiled by the CLI Interpreter. The "method" corresponds to the Method_name of the CLIAction. The Method_name may be retrieved using a "getMethod ( )" method in the class of the objects described above. For each of the types in the "argument_types" array, a "constructor" from "String" is retrieved and stored in the array in argument order. In this way arguments can be constructed from the tokens on the command line.

When a CLIState is reached such that an action should be performed (i.e. it is either a terminal node with a resolved action, or it is an input that has ended at a non terminal node with an action), an "execute ( )" method of the CLIAction is called for that CLIState. This method marshals the remaining tokens into method arguments by calling the constructors in the "constructors [ ]" array. The method is then invoked for the resolved object. The following example illustrates a resolved CLIAction instance. The left side is the CLIAction and the right side is the resolved "ethManager" instance.

```
object_name ="ethManager"
method_name ="show"
argument_types ={"java.lang.String"}       } public void show (String id) { }
argument_help ={"<0–6> Fast..."}
   object
   method
   constructor = { String(String), }
```

Figure 12:
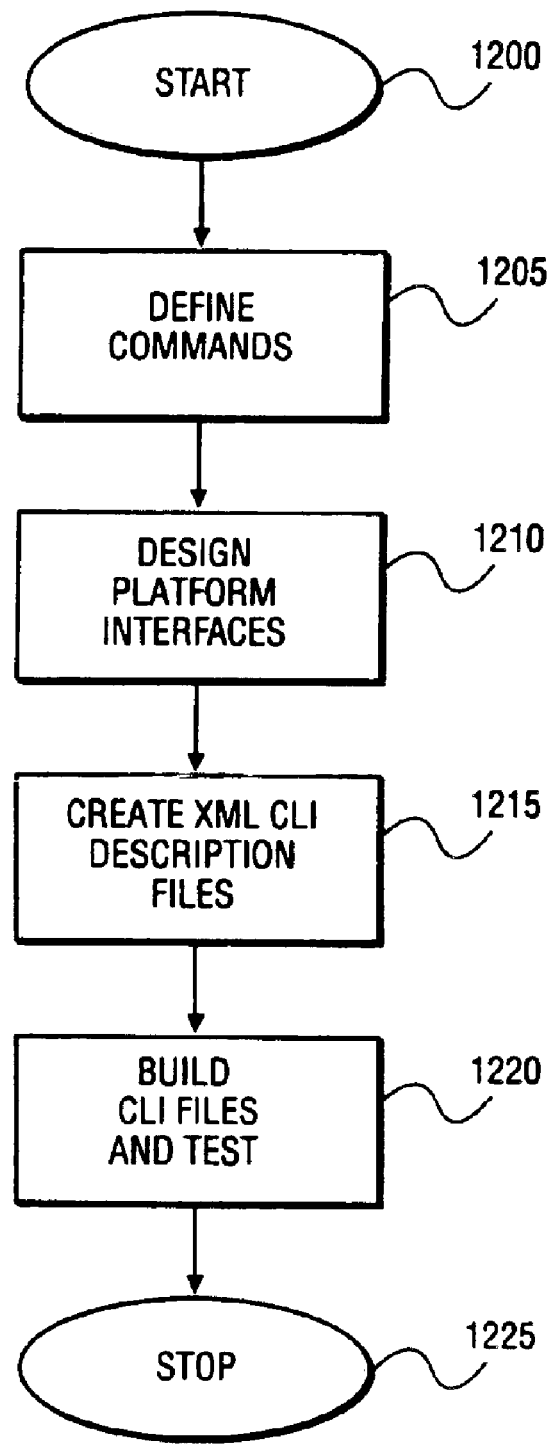
FIG. 12 illustrates an exemplary block diagram of one embodiment of the design process to implement the CLI application.

FIG. 12 illustrates an exemplary block diagram of one embodiment of the design process to implement the CLI application. The design process integrates and implements CLI commands in the framework described herein. The process starts at block 1200. At block 1205, the CLI commands are defined. For example, this may include defining command input and output requirements, assignment of the mode for the command, defining the set of keywords and sub keywords for the command, defining the argument set for each action of the command (this may include a consideration of the Java classes that will be constructed from the string input), defining help texts for each keywords and argument, etc.

At block 1210, the system interface is designed and implemented. This includes defining the Java classes and methods with each action specified in the command definition having an object and method associated with them to perform the semantics required by the command. This also includes defining the arguments where each argument of the specified method having a constructor from "String" that can be invoked, and defining object registration to establish names for each object instance for mapping in XML.

At block 1215, the XML CLI description files are created. The XML CLI description files may be written and added directly to the CLIBuilder after the command definition and system interface design are complete. At block 1220, the new ".xml" XML CLI description files are built using the CLIBuilder to create ".cli" files. The resulting ".cli" files may then be downloaded to the system and tested. The design process ends at block 1225.

Following is an example of designing a CLI application using the design process illustrated in the flow diagram in FIG. 12. The example is described using the commands "show date", "show date detail", and "set clock".

Following are exemplary desired input and output formats for these commands:

```
input>    show clock
output>   04:10:12.621 UTC Thu May 6 1993
input>    show clock detail
output>   04:10:28.109 UTC Thu May 6 1993
             Time source is user configuration
input>    clock set?
output>   hh:mm:ss Current Time
input>    clock set 00:00:00?
output>   <1–31> Day of the month
input>    clock set 00:00:00 1?
output>   MONTH Month of the year
input>    clock set 00:00:00 25 Sep?
output>   <1993–2035>Year
input>    clock set 00:00:00 31 Feb 2000
output>   Invalid date (doesn't exist)
input>    clock set 00:00:00 25 Sep 2000
output>
```

The above exemplary commands reside in an "executive" mode of the CLI. The "show date" and "show date detail" commands are also in the global mode or user mode so the same XML text to describe the commands are put in XML CLI description file for the global mode and for the user mode. FIG. 13 illustrates exemplary keyword sets for each of these commands. For example, for the command "show date detail" 1305, the corresponding keyword set 1310 include the keywords "show", "date" and "detail". In the current example, the "show date" and "show date detail" commands do not have arguments. However, the "clock set" command has several arguments. FIG. 14 illustrates exemplary arguments for the "clock set" command.

FIG. 15 illustrates exemplary help strings for different command sequence. It is suggested that each command keyword have a help message. In the current example, following are some help messages for the clock command.
   Prompt>?
   . . .
   clock Manage the system clock . . .
   show Show running system information . . .
   Prompt>show ?
   . . .

clock Display the system clock
. . .
Prompt>show clock detail?
clock Display detailed information
Prompt>clock ?
set Set the time and date The following descriptions involve system interface design and implementation. This includes Java class definition, method definition and argument mapping. To implement the command definition, a Java class is written having methods that can be invoked by the CLI to perform the required semantics. For example, for the exemplary commands described above, a single Java class called "clock" is created with the following methods:

```
public class clock {
    /** Display the system clock */
    public void show ()
    /** Display detailed information */
    public void showDetail ()
    /** Set the time and date */
    public void set  (String time, Integer day, String month,
                      Integer year)
```

FIG. 16 is an exemplary table illustrating CLI arguments to Java type mapping. The table list argument number 1605, the argument description 1610 and the Java type 1615 for the arguments of the "clock set" command. Using the "clock set" command example, to implement the command via the description of the arguments, each argument is converted from the input string into a selected Java type 1615. Each of the selected Java types 1615 is an existing Java class that has an existing constructor "Java.lang.String" 1620. If a user-defined class is used, a constructor from "Java.land.String" 1620 needs to be provided in order for the CLI to be able to construct and marshal the arguments from the input to the method.

Given the class definition described above, at some point during the initialization of the system an instance of the class will be created. In the current example, the top-level CLI object will create a "Clock" instance during startup, then register (i.e., object registration) the instance with the CLI with the name "Clock", such as, for example:

CLIEngine.registerObject ("Clock", new Clock ( )).

Once the commands are defined, the system interface methods are defined and implemented, and the instance is named and registered, the full XML CLI description files for the commands can be written. FIG. 17 illustrates an exemplary XML CLI description file for the "show clock" and "show clock detail" commands. FIG. 18 illustrates an exemplary XML CLI description file for the "clock set" command.

FIG. 19 illustrates exemplary Java methods for the "clock set" and "clock set detail" commands. The methods output the current date to the output stream in the proper format. Using the Java data formatting classes greatly simplifies the effort. The "clock set" command is a little more complex because it includes arguments. The presence of the arguments to the method requires additional processing for the method. There are two parts to this processing, validating the arguments and performing the required action.

Argument validation comes in two forms, individual validation and multiple argument consistency. A command may require either, both or none of these validations. For example consider the day of the month argument for the "clock set" command. A string input to this argument that cannot be parsed into an integer is invalid. The expected input also must be in the range from 1 to 31 to be considered a valid input to this argument. This is an example of individual argument validation. The day of the month value of "31" will be individually validated by the above definition but makes sense only for certain values of the next argument (i.e., the month). For example, "February 31" is obviously an invalid date. This is an example of multiple argument consistency. In one embodiment, individual argument consistency checks can be done at two levels, by the constructor for the input argument or by the method itself, while multiple argument consistency checks are performed by the method.

In one embodiment, argument correctness violations are handled in the method by throwing an ArgumentException instance. The number of the offending argument and position of the error in the argument can be set in the ArgumentException. The CLI interpreter responds to the exception with an output making the invalid argument. The following example illustrates the invalid argument and the output marking '^' by the CLI application.

Prompt> clock set 00:00:00 ggg Feb 2000

%Invalid input detected at the '^' marker

FIG. 20 illustrates an exemplary Java method for the "clock set" command. Again the use of the Java language greatly simplifies the implementation.

Using the method of the present invention, commands that are associated with the system to control the system can be shielded from the user. These commands can be described and expressed using a generalized markup up language (e.g., XML) as a description language. A set of commands is defined by describing all of the commands to be used with the system. The commands are mapped to the services available in the system using objects and methods defined in Java classes. Using this method also shield the users from changes or version upgrades applied to the operating software of the system. In addition, when a new system is used, the commands can be made to be the same by describing and mapping the commands to the objects and methods of the new system.

The operations of the various methods of the present invention may be implemented by a processing unit in a digital processing system, which executes sequences of computer program instructions which are stored in a memory which may be considered to be a machine readable storage media. The memory may be random access memory, read only memory, a persistent storage memory, such as mass storage device or any combination of these devices. Execution of the sequences of instruction causes the processing unit to perform operations according to the present invention. The instructions may be loaded into memory of the computer from a storage device or from one or more other digital processing systems (e.g. a server computer system) over a network connection. The instructions may be stored concurrently in several storage devices (e.g. DRAM and a hard disk, such as virtual memory). Consequently, the execution of these instructions may be performed directly by the processing unit.

In other cases, the instructions may not be performed directly or they may not be directly executable by the processing unit. Under these circumstances, the executions may be executed by causing the processor to execute an interpreter that interprets the instructions, or by causing the processor to execute instructions which convert the received instructions to instructions which can be directly executed by the processor. In other embodiments, hard-wired circuitry may be used in place of or in combination with software instructions to implement the present invention. Thus, the present invention is not limited to any specific combination of hardware circuitry and software, nor to any particular source for the instructions executed by the computer or digital processing system.

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method, including:
   defining a set of commands to be used with a command line interface (CLI), each command in the set of commands specifying an action to be performed in a system;
   defining a set of system interfaces including objects and methods, wherein each action specified in the command is associated with an object and an method, the object and the method performing semantics required by the command; and
   creating a CLI description file for each command in the set of commands to abstract the CLI from the system, the CLI description file mapping the command to be used with the CLI with the action and the associated objects and the associated methods,
   wherein the command is to be entered into the system in text mode.

2. The method of claim 1, wherein defining the set of commands includes defining keywords, arguments, input and output requirements for each command.

3. The method of claim 2, wherein defining the keywords and the arguments for each command includes defining help texts for the keywords and for the arguments.

4. The method of claim 2, wherein defining the input requirements includes defining an argument set for the command, and wherein defining the output requirements includes defining a display format to display a result responsive to executing the command.

5. The method of claim 4, wherein the argument set is associated with the action of the command, and wherein the argument set is included in an input string specified with the command, the argument set including zero or more arguments.

6. The method of claim 5, wherein an argument type is selected for each argument, and wherein each argument type is implemented as a Java class.

7. The method of claim 1, wherein defining a set of interfaces including objects and methods includes defining a Java class for the action, the Java class for the action naming the object associated with the action and having methods that can be invoked when performing the action.

8. The method of claim 7, further including registering the object with the system such that when the action is performed, the methods are invoked.

9. The method of claim 1, wherein the CLI description file is created using a generalized markup language.

10. The method of claim 9, wherein the generalized markup language is Extensible Markup Language (XML).

11. The method of claim 10, further including: compiling the CLI description file to generate a run time module.

12. A computer readable medium having stored thereon sequences of instructions which are executable by a digital processing system, and which, when executed by the digital processing system, cause the system to perform a method including:
    defining a set of commands to be used with a command line interface (CLI), each command in the set of commands specifying an action to be performed in a system;
    defining a set of system interfaces including objects and methods, wherein each action specified in the command is associated with an object and an method, the object and the method performing semantics required by the command; and
    creating a CLI description file for each command in the set of commands to abstract the CLI from the system, the CLI description file mapping the command to be used with the CLI with the action and the associated objects and the associated methods,
    wherein the command is to be entered into the system in text mode.

13. The computer readable medium of claim 12, wherein defining the set of commands includes defining keywords, arguments, and input and output requirements for each command.

14. The computer readable medium of claim 13, wherein defining the keywords and the arguments for each command includes defining help texts for the keywords and for the arguments.

15. The computer readable medium of claim 13, wherein defining the input requirements includes defining an argument set for the command, and wherein defining the output requirements includes defining a display format to display a result responsive to executing the command.

16. The computer readable medium of claim 15, wherein the argument set is associated with the action of the command, and wherein the argument set is included in an input string specified with the command, the argument set including zero or more arguments.

17. The computer readable medium of claim 16, wherein an argument type is selected for each argument, and wherein each argument type is implemented as a Java class.

18. The computer readable medium of claim 12, wherein defining a set of interfaces including objects and methods includes defining a Java class for the action, the Java class for the action naming the object associated with the action and having methods that can be invoked when performing the action.

19. The computer readable medium of claim 18, further including registering the object with the system such that when the action is performed, the methods are invoked.

20. The computer readable medium of claim 12, wherein the CLI description file is created using a generalized markup language.

21. The computer readable medium of claim 20, wherein the generalized markup language is Extensible Markup Language (XML).

22. The computer readable medium of claim 12, further including:
    compiling the CLI description file to generate a run time module.

23. A method, including:
    defining a set of commands to be used with a command line interface (CLI);
    defining keywords, arguments, input and output requirements for each command, each command in the set of commands specifying an action to be performed in a system;

defining a set of interfaces including objects and methods, wherein each action specified by the command is associated with an object and a method, the object and the method performing semantics required by the command;

creating a CLI description file for each command in the set of commands to abstract the CLI from the system, the CLI description file mapping the command to be used with the CLI with the action and the associated objects and the methods, wherein the CLI description file is created using Extensible Markup Language (XML); and compiling the CLI description file to create a run time module, wherein the command is to be entered into the system in text mode.

24. The method of claim 23, wherein defining the keywords and the arguments for each command includes defining help texts for the keywords and for the arguments.

25. The method of claim 23, wherein defining the input requirements includes defining an argument set for the command, and wherein defining the output requirements includes defining a display format to display a result responsive to executing the command.

26. The method of claim 25, wherein the argument set is associated with the action of the command, and wherein the argument set is included in an input string specified with the command, the argument set including zero or more arguments.

27. The method of claim 26, wherein an argument type is selected for each argument, and wherein each argument type is implemented as a Java class.

28. The method of claim 23, wherein defining a set of interfaces including objects and methods includes defining a Java class for the action, the Java class for the action naming the object associated with the action and having methods that can be invoked when performing the action.

29. The method of claim 28, further including registering the object with the system such that when the action is performed, the corresponding methods are invoked.

* * * * *